Nov. 21, 1939. L. G. COPEMAN Re. 21,269

PROCESS OF COATING KNIT ARTICLES AND PRODUCTS THEREOF

Original Filed Feb. 25, 1937

INVENTOR.
LLOYD G. COPEMAN

BY
Barnes, Kisselle, Laughlin & Raisch
ATTORNEYS

Reissued Nov. 21, 1939 Re. 21,269

UNITED STATES PATENT OFFICE 21,269

PROCESS OF COATING KNIT ARTICLES AND PRODUCTS THEREOF

Lloyd Groff Copeman, Lapeer, Mich., assignor to Copeman Laboratories Company, Flint, Mich., a corporation of Michigan Original No. 2,172,251, dated September 5, 1939, Serial No. 127,714, February 25, 1937. Application for reissue September 9, 1939, Serial No. 294,222

16 Claims. (Cl. 91—68)

This invention relates to a process of coating knit articles and products thereof, and has to do particularly with a novel process of coating or treating knit articles formed of thin fine threads which are easily subject to "laddering" or "runs" such, for instance, as sheer silk stockings.

This application is a continuation in part of my application Serial No. 708,163 filed Jan. 24, 1934, which is a continuation in part of another application Serial No. 407,363, filed November 15, 1929.

Heretofore, the tendency of thin fine knit articles to "ladder" has been considered more or less a necessary disadvantage, and in general this tendency to "ladder" or "run" has been present in fine, thin, knit articles, such as stockings, regardless of the quality thereof. Attempts have been made to treat knit articles to reduce the tendency to "run" or "ladder", some of which attempts have embodied the stiffening of the threads so as to make it difficult for one loop to slide past the other, while other attempts have embodied the treating of knitted articles formed of artificial cellulose threads with a gas or a solution so as to attach the artificial fibers and melt or stick them slightly together.

It is the object of the present invention to treat a knitted article with a coating material in such a manner that the various threads forming the loops will be covered with a binding material at the points of contact. This coating may be of any desired substance but I prefer to use what is known as rubber latex. This latex may be applied in many different ways such as by dipping or spraying but the point is that it is applied in its original fluid state, then substantially removed from the knit article so as to leave the spaces between the threads open and a very thin coating around the threads and/or around the points where the loops contact, the thin coating is then allowed to coagulate whereby to form a thin elastic and flexible sheath to prevent any possiblity of "laddering" or "running" in the final product; the sheath around each discrete thread being so thin as to be substantially indiscernible to the eye and imperceptible to the touch.

The present process is applicable to knit articles formed of any kind of thread and in any form of web, but it will be recognized that it has no particular function unless such threads are knitted in such a form as will result in "runs" or "laddering" in case one of the loops become broken. It will, therefore, be obvious that the present invention is particularly important in connection with stockings, the threads of which are very thin and open.

Figure 1:
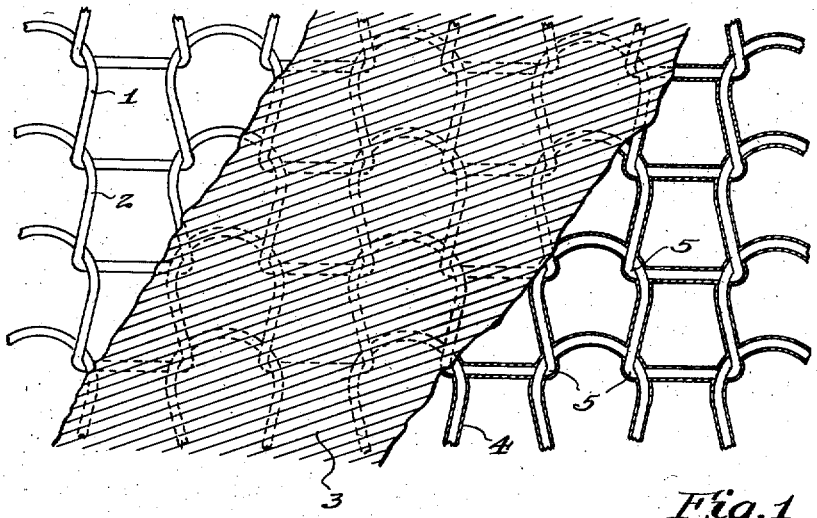
Fig. 1 is an enlarged view of a section of a knit article illustrating the three main steps in my preferred process of coating, the sheath or coating of rubber in the third step being slightly exaggerated in addition to the enlargement.

In carrying out the invention, a knitted article such as a stocking and the like having threads which are formed into loops as at 1 and 2, may be dipped into a solution of rubber latex so that the entire article is covered with a thin layer of latex such as shown at 3 in Fig. 1. This thin film of latex covering all of the loops is then preferably subjected to a blast of air so that substantially all of the thin film of latex is blown away leaving a very thin coating of the latex around each thread as at 4 and preferably around each point 5 where the threads or loops contact.

It is the surrounding of the knots or points of contact 5, by the rubber latex, that solves the problem. After substantially all the film of latex has been blown away or otherwise removed, the article may then be vulcanized by any of the well known processes. This vulcanizing step takes but a relatively short time after which the stocking or other article is in condition for commercial use.

The latex used in coating the knitted article, may, of course, be tinted so as to produce any color desired. In all instances, I prefer to use as thin a solution of latex as possible and to produce a final article wherein the individual threads are also coated with as thin a film of latex as possible. In those instances where all the threads and the entire length of each thread is coated, it will be obvious that such latex coating must either be transparent or else be tinted to obtain the desired shade. It may be desirable to knit the article with the original undyed or uncolored thread and obtain the desired color by the coating.

It will be understood that this solution of latex may be applied to the stocking or other article in many different ways, and the present invention is not concerned with the manner of applying the latex but merely with the fact that the latex is applied as a coating. It will also be understood that the article may be dipped in latex producing a thin film 3 or may be initially sprayed so as to merely cling to the various threads making up the loops.

Figure 2:
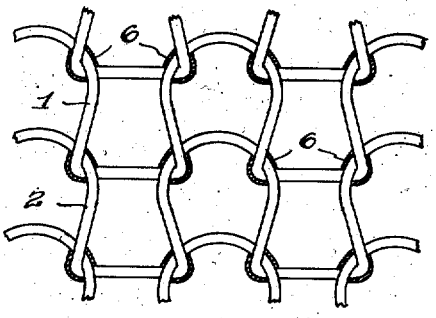
Fig. 2 is an enlarged view similar to Fig. 1 but illustrating the manner of isolating the coating to the points of contact between the loops.
Figure 3:
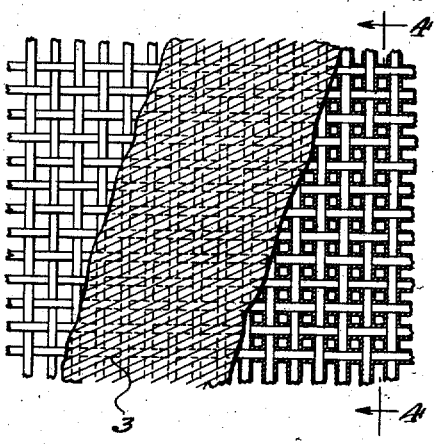
Fig. 3 is a view similar to Fig. 1, but showing the different type of weave, the thickness of the sheath of rubber being considerably exaggerated in the third step, the actual opening between the threads in the third step being substantially the same as that shown in the first step.
Figure 4:
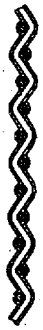
Fig. 4 is a sectional view taken on line 4—4 of Fig. 3.

Instead of coating all of the threads with latex I may subject the article to such a blast of pressure, or so initially apply the latex that it covers only such portions of the threads as contact in forming the loops so as to form what might be termed knots of rubber latex at all the points of contact. Such knots may be designated 6 as shown in Fig. 2.

It will be understood that I am in no way limited to the particular coating utilized in covering the threads or the joint between the threads, the gist of the invention being in the permanent joining of the loops at their points of contact by coating the loops so as to form what might be termed "minute knots". In the case of isolating the coating to the points of contact between the loops, it will be obvious that the color effect may be maintained by the original knit article, otherwise when the entire stocking and each thread and loop is coated it will be obvious that the coating material must be tinted unless the same should be transparent.

As an example of the manner in which the process may be carried out, sheer silk stockings, either before or after being dyed, are preferably washed in an alkaline solution to clean the fibers. After this the stockings may be rinsed in clear water and then machine dried by a centrifugal action. An intermediate step may be introduced here, namely, that of wetting the stocking with an ammonia solution (3% has been found to be satisfactory) so as to promote or accelerate the absorption or permeation of the rubber particles to the threads; excess ammonia may be removed by placing the stockings in a centrifugal machine or passing them through a wringer. The stockings are then ready for immersion in a latex bath. It will be understood here that this bath may be any dispersion of rubber, natural or synthetic, the latex bath being the preferred form and referred to as a matter of convenience.

In every instance where a sheath is formed around the individual discrete threads I use as thin a solution of latex as possible but with a sufficient concentration to produce in the final article a substantially continuous sheath around the individual threads after the water has evaporated. It will be obvious that many different concentrations may be used with different kinds of stockings or knitted articles and under different conditions so as to make it practically impossible to give any definite concentration of the dispersion. In every case the dispersed rubber bath is of a dilute nature and in the use of a latex bath I have found that the most desirable concentrations of latex are above 5% to 10%. In most instances the amount of dispersed rubber solids concentration will be determined by cut and try method; in most tests I have found that at least a 10% concentration is necessary to form a substantially continuous and uniform sheath after the water evaporates.

Continuing the steps as above set forth, the stockings are next immersed in the dilute latex bath or subjected to a spray of this same bath, preferably at about room temperature, after which they may be run through a wringer having regulable pressure or a centrifugal machine to remove excess latex, but leave enough latex around each thread to form a thin sheath of rubber after coagulation. The dipping step is of relatively short duration, usually from fifteen seconds to about two minutes, and after removal of the stockings from the wringer the treated stockings may be air dried or force dried and the coagulation of the dispersed rubber particles together and around the threads is gradual and what might be termed fairly rapid; after this step the stockings may be immersed in a hot water bath for approximately ten minutes at 120° F. to obtain a partial vulcanization of the deposited particles of rubber. (If desired, final vulcanization may take place at this point at around 212° F.) The stockings are then removed from the hot water bath, machine dried, preferably by a centrifugal machine, to remove all water, after which they may be subjected to a vulcanization step in electric or steam heat for approximately thirty minutes at 212° F., after which they are again washed in perfumed soap suds. The stockings may then be carted or framed in the usual manner so as to stretch and dry to the proper shape and size. The threads of the sheer stockings may be originally dyed after the extremely thin sheath of rubber has been formed around each thread, or the stocking may be redyed, the actual dying step taking place right through the rubber sheath.

Another specific method of carrying out the invention involves the use of an ammonia bath which may be a 3% solution. This ammonia bath may be separated from a dilute latex bath by wringers and the stockings, after being dipped in the ammonia, passed through the wringers, very tightly adjusted, and then dipped into the dilute latex bath. The stockings may then be run through a wringer or subjected to a centrifugal action and then air dried for fifteen or twenty minutes to bring about coagulation. The stockings may then be stretched on a frame and dipped into a solution of solvent, such as benzol, sufficient to render the stockings gummy or to slightly melt the latex so as to obtain a strong bond with a relatively thin solution of latex just prior to vulcanizing, after which the stockings may be vulcanized by air drying or such vulcanization accelerated by heat. In the case of heavy stockings, they may be dipped in the benzol after vulcanizing.

It will be understood that where the stocking or other knit articles is dipped in a dilute latex solution of correct concentration and at room temperature the resulting mechanical adhesion of the latex to the individual threads is immediate and complete, so that the article may be withdrawn from the bath after fifteen seconds to two minutes; however, any accidental or intentional prolonging of the dipping step, even up to an hour, will not change this initial condition and the depth of the coating on the removed threads as long as the concentration and condition of the latex solution remains constant.

It will be thus seen that I have produced a knit article the threads or loops of which are permanently tied together to effectively prevent "laddering" or "running". Such tying together of the respective loops is much more effective than if such loops were really tied together by separate knots, because of the fact that the coating which ties the loops together at their point of contact also adheres to the threads and thus prevents any possible slipping through of the loops. Also, the threads of stockings and other knit articles produced by this process are given such a uniform rubber sheath, either continuous or partially continuous up to and around the points of contact, which sheath being deposited from non-coagulated latex is so thin as to in no way alter the normal appearance of the stocking or other knit article treated. In many cases it is impossible to tell the difference in the feel between an untreated stocking and one treated in accordance with the present process, and also practically impossible to tell the difference in appearance with the exception of a slightly different shade of color given to the one stocking by the deposited rubber coating. There is no difference in feel to the unskilled fingers, but to very sensitive skilled fingers, the stocking treated according to the present process is smoother and is decidedly more sheer in appearance. In all cases wearing qualities are greatly increased; this is particularly so in the heavier service weight stockings where even a thicker sheath of rubber may be deposited around the individual threads. It will further be seen that stockings treated in accordance with the present invention do not absorb moisture. The closely woven foot portion wears much longer, the whole stocking is spot proof in that small spots of mud and the like may be easily rubbed or washed therefrom, the thin sheath of rubber also makes the article moth proof and prevents shrinkage.

It will be understood that any of the well known aqueous dispersions of rubber and similar materials may be used for carrying out the invention as long as such dispersions or colloids, or whatever name is given them, may be diluted sufficiently to produce when coagulated a relatively thin sheath; either around the entire thread or sufficient to tie the threads together at their points of contact: accordingly, the word rubber" is used in the claims in a generic sense and contemplates the various known dispersions, emulsions or solutions of finely divided rubber or resin particles and the like with or without the usual stabilizing and/or vulcanizing agents, whether natural or artificial. While applicant does not desire to be limited in all cases to a complete final sheath around every individual thread, the dilute solution is always concentrated enough and maintained in such condition as to leave a continuous layer of natural treating solution mechanically adhered around each thread after removal from the bath or after the spray, as distinguished from the effect obtained by immersing the articles for a relatively long time in a bath of latex maintained at relatively high coagulating temperatures.

An important feature of this invention is that a thin film of an aqueous dispersion of rubber or the like is formed around each discrete thread, either by dipping or spraying, and this coating is in non-coagulated form; after removal of excess latex or the like, such as by pressing through a wringer, the continuous thin coating is then coagulated to form a thin substantially uniform and continuous sheath of rubber. Where the latex is coagulated in the bath as in the patent to Teague No. 1,845,569, and in the patent to Dreyfus 1,870,408, the deposit of the coagulated particles of rubber on the threads must be discontinuous and non-uniform, even up to a 10% concentration of latex. It is the teaching of the present invention that to obtain a thin coating of rubber on a discrete thread, it is necessary to originally apply the aqueous dispersion of rubber or the like, as a thin non-coagulated film to the threads.

What I claim is:

1. The process of treating silk textiles of the type so woven as to be subject to laddering, which comprises coating the individual threads of each discrete loop with an aqueous dispersion of rubber in dilute form and containing only sufficient rubber solids to adhere to the individual threads as a substantially uniform non-coagulated coating, the spaces between the threads remaining open, precipitating rubber from such dilute dispersion upon the surface of each individual thread to form a very thin and uniform sheath of rubber substantially covering the thread, and then vulcanizing the same.

2. A process of treating textile articles having fine threads for preventing "runs" and for protecting the threads against moisture, spotting and moths, which comprises coating the individual threads and discrete loops of the article with a non-coagulated dilute solution of an aqueous dispersion of rubber containing only sufficient rubber solids to mechanically adhere as a substantially uniform coating, removing any aqueous dispersion from the spaces formed by the threads, evaporating the carrying agent and depositing the dispersions of rubber in such a thin uniform coating substantially covering each discrete thread so as to not visibly change the structural appearance of the original article.

3. The art of treating textile articles of the type having interconnected loops of thread to tie said loops of thread together at their points of contact and for protecting the threads against moisture, spotting and moths, which comprises coating the discrete threads of the article with a thin non-coagulated solution consisting of an aqueous dispersion of rubber containing sufficient rubber solids to mechanically adhere as a substantially uniform coating, mechanically removing any of said solution from the spaces between the threads and all excess solution and evaporating the carrying agent and depositing the dispersions of rubber in such a thin uniform and substantially continuous coating around each loop of thread and adjacent the point of contact with another loop of thread as to not appreciably change the visible appearance of the original article, and then vulcanizing the thin layer of rubber to substantially tie the adjacent loops together.

4. The art of treating knit articles to prevent running of the loops and for protecting the threads against moisture, spotting and moths, which comprises coating the individual threads of interconnected loops and adjacent their points of contact, with a dilute non-coagulated solution such as an aqueous dispersion of rubber and the like adapted to adhere as a thin film and containing not less than 5% of coating solids, with the spaces between the threads free from coating material, evaporating the carrying agent and depositing said solids whereby to form a thin substantially continuous non-visible and highly flexible coating for the discrete threads and adjacent their points of contact, uniting the coatings of separate but adjacent threads at said points of contact to tie the threads together, and stretching the article to its proper shape and size before curing sets in.

5. The process of treating knit articles such as sheer silk stockings and the like to prevent "runs" therein, which comprises immersing the same in an aqueous dispersion of rubber in dilute form but containing not less than approximately 10% of rubber solids, removing the treated articles from the bath and mechanically removing the excess aqueous dispersion, coagulating the rubber on the individual threads in a substantially enclosing sheath, and finally drying the same in the form desired.

6. The process of treating knit articles such as sheer silk stockings and the like subject to easy laddering which comprises immersing the same in an aqueous dispersion of rubber in dilute form, containing not less than approximately 10% of rubber solids, removing the treated articles from the bath, depositing the rubber solids on the individual threads of the articles particularly at their points of contact, mechanically removing excess treating material therefrom, and then vulcanizing said deposited rubber solids to bind adjacent threads together at their points of contact.

7. The process of treating knit articles such as sheer stockings and the like, which comprises covering the individual threads with an aqueous dispersion of rubber in dilute form, said dispersion containing just sufficient rubber solids (not less than 5%) as to form a thin non-coagulated sheath around the individual threads, the spaces between the threads remaining open, precipitating rubber from such dilute dispersion by coagulation of the particles together and over the surfaces of the individual threads in substantially continuous form, and then drying.

8. The process of treating knit articles, which comprises wetting the articles with a solution adapted to accelerate absorption of an aqueous dispersion of rubber, coating the threads of the so treated articles with a non-coagulated dilute aqueous dispersion of rubber containing not less than 5% rubber solids, mechanically removing excess dispersion from the articles, and then drying and vulcanizing the treated articles.

9. The process of treating knit articles, which comprises wetting the articles with a solution adapted to accelerate absorption of an aqueous dispersion of rubber, coating the threads of the so treated articles with a dilute non-coagulated aqueous dispersion of rubber, mechanically removing excess dispersion from the articles, and then immersing the articles in hot water for a sufficient time to partially vulcanize the particles of latex surrounding each individual thread, drying the articles and then finally vulcanizing same.

10. The process for strengthening fibrous associations comprising depositing in situ thereon and substantially uniformly throughout the same rubber coagula from a dilute aqueous dispersion of rubber of not less than approximately 10% concentration, the resulting rubber being distributed throughout the surface of the fibrous association in such a manner as to be substantially indiscernible to the eye and imperceptible to the touch.

11. A silk stocking having the individual threads secured against the propagation of "runs" and protected against moisture, spotting and moths by a thin sheath of rubber substantially surrounding the individual threads up to their points of contact, said rubber being deposited from a coating of non-coagulated aqueous dispersion of rubber on the threads, the respective sheaths of rubber being merged together at said points of contact whereby to prevent any severed thread from "running" past said points of contact; substantially identical with the product of claim 1.

12. A silk stocking having the individual threads secured against the propagation of "runs" by a thin substantially continuous sheath of flexible material substantially surrounding the individual threads up to their points of contact, said material being deposited from a coating of non-coagulated solution of said material on the threads, the respective sheaths of flexible material being merged together at said points of contact whereby to prevent any severed thread from "running" past said points of contact, said sheaths of material around the individual threads being so thin as not to appreciably change the normal appearance of the original stocking; substantially identical with the product of claim 4.

13. A knit article formed of connected relatively widely open loops and a thin elastic coating of rubber deposited from a coating of a non-coagulated aqueous dispersion of rubber for substantially covering discrete adjacent loops of thread at their points of contact substantially identical with the product of claim 2.

14. A knit article formed of connected relatively wide open loops with which is associated a deposit of an aqueous dispersion of rubber, said deposit on the individual fiber components of the knit article being from an original coating of a non-coagulated dispersion of rubber while on the individual fiber components such as to form an extremely thin sheath substantially covering the fiber components, said thin deposit of rubber varying according to the size and weight of the fiber components but in any case being substantially indiscernible to the naked eye and imperceptible to the touch, and said deposit on adjacent fiber components of said knit article bonding said fiber components together at their points of contact; substantially identical with the product of claim 10.

15. A knit or similar textile article comprising spaced interconnected threads and a coating of substantially transparent flexible material for substantially covering and bonding together discrete adjacent threads at their points of contact substantially identical with the product of claim 10.

16. A knit or similar textile article comprising spaced interwoven threads bonded together solely at the contacting areas of interweave thereof by a thin covering of flexible material selected from the group including dispersions, emulsions or solutions of finely divided rubber or resin particles, said covering of material being so thin and transparent as not to appreciably change the normal appearance of the original article; substantially identical with the product of claim 2.

LLOYD GROFF COPEMAN.